United States Patent
Palat et al.

(10) Patent No.: US 6,928,284 B2
(45) Date of Patent: Aug. 9, 2005

(54) INHIBITING HANDOVER TO A NEW SERVING GPRS SUPPORT NODE DURING A REAL-TIME CALL IN A TELECOMMUNICATION SYSTEM

(75) Inventors: Sudeep Kumar Palat, Grange Park (GB); Hatef Yamini, Swindon (GB); Jin Yang, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 776 days.

(21) Appl. No.: 09/788,898

(22) Filed: Feb. 20, 2001

(65) Prior Publication Data

US 2001/0034234 A1 Oct. 25, 2001

(30) Foreign Application Priority Data

Feb. 22, 2000 (EP) .......................................... 00301376

(51) Int. Cl.[7] ................................................ H04Q 7/20
(52) U.S. Cl. ...................... 455/436; 455/437; 455/438; 455/442; 455/450; 370/331
(58) Field of Search ................................ 455/436, 437, 455/438, 442, 445, 450, 455; 370/328, 352, 401

(56) References Cited

U.S. PATENT DOCUMENTS

| | | | |
|---|---|---|---|
| 5,873,035 A | * | 2/1999 | Ladden et al. ............... 455/436 |
| 6,353,607 B1 | * | 3/2002 | Valentine et al. ............ 370/349 |
| 6,515,997 B1 | * | 2/2003 | Feltner et al. ............... 370/401 |
| 6,636,491 B1 | * | 10/2003 | Kari et al. .................. 370/328 |
| 2002/0065072 A1 | * | 5/2002 | Lindh ......................... 455/422 |

FOREIGN PATENT DOCUMENTS

| | | | | |
|---|---|---|---|---|
| WO | WO92/19054 | | 10/1992 | ............ H04J/3/14 |
| WO | WO99/34635 | | 7/1999 | ............ H04Q/7/38 |
| WO | WO-9934635 | * | 7/1999 | ............ H04Q/7/38 |

OTHER PUBLICATIONS

Performance Evaluation Of Connection Rerouting Schemes For ATM–Based Wireless Networks, R. Ramjee, T. La Porta, J. Kurose, D. Towsley, IEEE/ACM Transactions On Networking vol.: XP–000755004, (1998) 249–261.
European Search Report dated Jul. 19, 2000.

* cited by examiner

*Primary Examiner*—Stephen D'Agosta

(57) ABSTRACT

A mobile telephone system providing general packet radio service (GPRS) includes a radio network controller (RNC) (2A) and/or a base station controller (BSC) and an associated serving GPRS support node (10A) for each domain. The RNCs (2A) and the SGSNs (10A) are interconnected by an Internet protocol (IP) network. When a mobile telephone (6A) moves from one domain to another, the RNC, in the new domain, takes over handling the mobile telephone. The current SGSN (10A) has a detector (20) which detects whether the existing transmission is a real-time transmission and, if it is, a diverter (22) comes into operation to couple the RNC in the new domain to the current SGSN (10A) rather than its associated SGSN (10A). When the call ends, the current SGSN (10A) hands-over the call to the SGSN (10A) in the new domain. This procedure ensures minimal interruption to real-time services by keeping the call anchored to the current SGSN (10A).

2 Claims, 3 Drawing Sheets

INHIBITING HANDOVER TO A NEW SERVING GPRS SUPPORT NODE DURING A REAL-TIME CALL IN A TELECOMMUNICATION SYSTEM

CROSS-REFERENCE TO RELATED APPLICATION

This application claims priority of European Patent Application No. 00301376.0, which was filed on Feb. 22, 2000.

BACKGROUND OF THE INVENTION

1. Field of the Invention

The present invention relates to telecommunication systems and, in particular, to systems offering general packet radio services (GPRS).

2. Description of the Related Art

Mobile systems include a plurality of mobile user equipment (UE) eg mobile telephones moving from one domain to another. Each domain includes a radio network controller (RNC) and/or base station controller (BSC) and an associated serving GPRS support node SGSN to handle the connection of each mobile UE in its domain with any other network. Each RNC can include a third generation UMTS (universal mobile telephone system) RNC or a second generation GPRS, BSC.

When a mobile UE moves to another domain, the RNC and SGSN in that other domain take over the handling of the connection between the mobile UE and the mobile network. An example of such a procedure is serving RNC (SRNC) relocation in which the RNC is in control of the call. The handover procedures can often result in a diminished service during the handover period.

The mobile system shown in FIG. 1 comprises an array of radio network controllers (RNC) 2 for controlling the connection of mobile UE's 6 with a the network.

Each RNC 2 is connected to a group of node B's 4. Each node B 4 is able to communicate with one or more mobile telephones 6 within its territory.

Each RNC 2 is in turn connected to a corresponding serving GPRS support node 10 via an Internet protocol (IP) network 8. The SGSN 10 is connected to home location register (HLR) 12 containing user information such as user identity and call service requirements. The SGSN is thus able to verify the identity of the user for security purposes and is also able to update the HLR with the current location of the user. Other functions are also possible.

The SGSN 10 is able to connect the mobile UE with other packet data networks (not shown) using a gateway GPRS support node (GGSN) 14.

Where a mobile telephone moves from being under the control of one (current) RNC 2 to another (target) RNC and the target RNC 2' does not share the same SGSN 10 with the current RNC, then a handover must take place from the current SGSN handling the mobile to the target SGSN 10' associated with the target RNC. The current SGSN 10, through the IP network, communicates with the target SGSN 10 to effect its handover to the target RNC 2. The target SGSN 10' must then contact the HLR 12 to re-establish the user identity and update the HLR 12 on user location.

Where real-time service is required, eg voice service, this procedure is likely to provide an undesirable interruption in communication.

This problem is solved with the system shown in FIG. 2. In FIG. 2, parts similar to those in FIG. 1 are similarly referenced but with the suffix A. It is an object of the present invention to provide an improved telecommunication system.

SUMMARY OF THE INVENTION

According to the present invention there is provided in a telecommunication system a plurality of radio network controllers (RNC) each associated with a corresponding serving, general packet radio serving (GPRS), support node (SGSN), each RNC providing a link between a user equipment located within its domain and its corresponding SGSN, an Internet protocol (IP) network linking all the RNCs and SGSNs; each SGSN being responsive to a request following the relocation of a user equipment into the domain of a target RNC to effect over a handover to cause the call to be re-routed through the SGSN associated with the target RNC, each SGSN having detection means for detecting when the call in progress is a real-time call and in response to a handover request, inhibiting the handover of the call to the SGSN associated with the target RNC, each SGSN having diverter means responsive to a handover request and to the detection means detecting a real-time call, to divert the connection from the target RNC with its corresponding SGSN and instead to re-route the call from the RNC to the current SGSN and maintain the re-routing until the detection means ceases to detect a real-time call whereupon handover to the SGSN associated with the target RNC is allowed to take place.

BRIEF DESCRIPTION OF THE DRAWINGS

A mobile telephone system embodying the present invention will now be described, by way of example, with reference to the accompanying diagrammatic drawings, in which.

DETAILED DESCRIPTION

Figure 1:
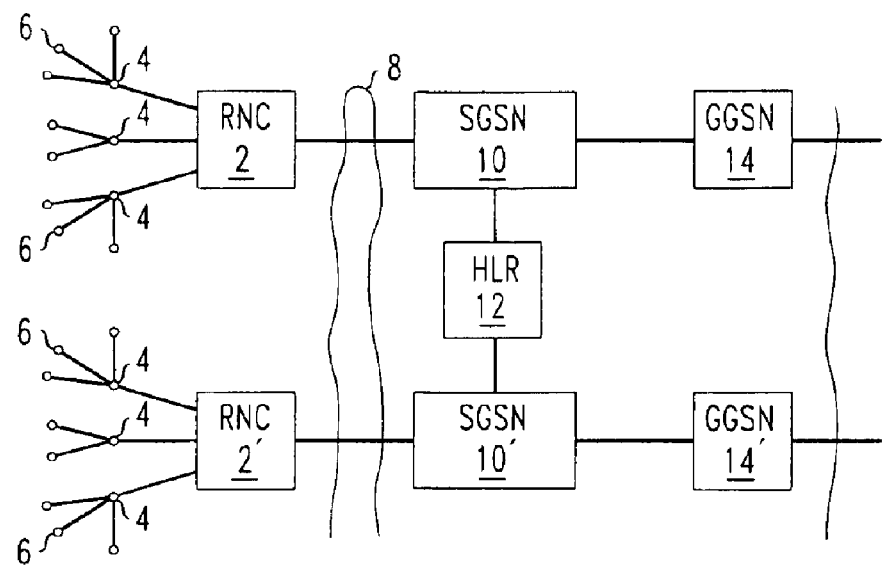
FIG. 1 is a block diagram of a previously proposed mobile telephone system.
Figure 2:
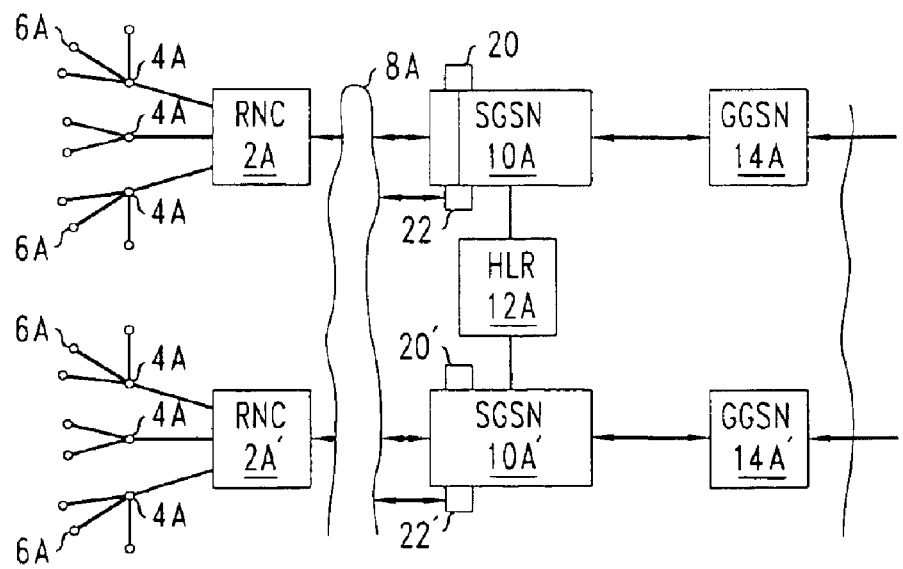
FIG. 2 is a block diagram of a mobile telephone system embodying the present invention.

As shown in FIG. 2, each SGSN 10A, 10A' is provided with additional circuitry consisting of a detection and inhibit circuit 20, 20A' which determines whether the data being transmitted is a real-time data or not and inhibits the handover from the current SGSN 10A to the target SGSN 10A' when real-time transmission is detected. Each SGSN 10A, 10A' is also provided with a diverter or anchor circuit 22, 22' which, in response to the detection of real-time signal by the circuit 20 20' and a request for SRNC relocation to a target RNC, 10A', communicates directly with the target RNC 2A' over the IP network 8A allowing the current SGSN 10A to continue to send and receive user data instead of the new SGSN 10A'.

In this way, the current SGSN 10A remains the anchor point for the communication and the only handover that takes place is from the source RNC 2A to the target RNC 2A'. A change of SGSN does not take place at this time and so the communication path between the existing SGSN 10A and GSSN 14A remains intact with the consequence that there is no significant interruption in the real-time service. When the real-time service requirement is finished, the circuit 20A detects this and now allows handover from the current SGSN 10A to the target SGSN 10A' to take place.

Figure 3:
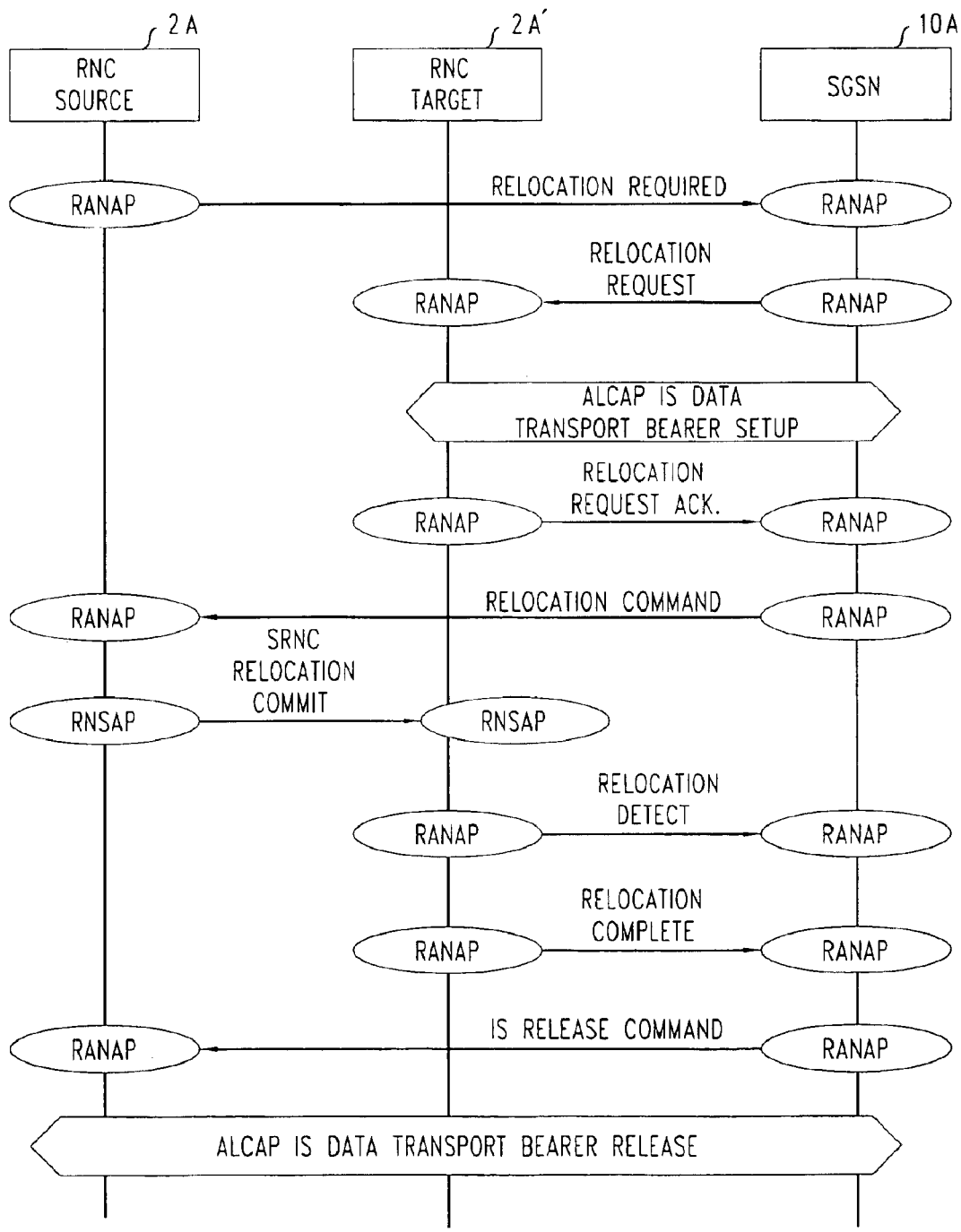
FIG. 3 is sequencing chart showing the anchored handover sequence used in the system of FIG. 2.

FIG. 3 shows the sequencing in which handover takes place from the source RNC 2A to the target RNC 2A' within the current SGSN 10A.

As shown, the source RNC 2A lodges a relocation requirement request to the current SGSN 10A. The current SGSN 10A detects the reel time service and transmits the relocation request to the target RNC 2A'. The ALCAP data transport bearer is set up between the target RNC 2A' and the current SGSN 10A. The target RNC 2A' acknowledges the relocation request to the current SGSN 10A. The current SGSN sends a relocation command signal to the source RNC 2A. The source RNC 2A transmits a relocation commit signal to the target RNC 2A' which responds by transmitting a relocation detect signal to the current SGSN 10A followed by a relocation complete signal. The current SGSN 10A sends a release signal to the source RNC 2A whereupon the data transport bearer set up between the source RNC 2A and the current SGSN 10A is released.

After the real-time signal ceases or at the end of a call, a modified source RNC relocation procedure is invoked by the current SGSN 10A, The existing SGSN relocation procedure is re-used to avoid setting up a new procedure. The difference being that this procedure is run with the target RNC 2A' addresses being set to the source RNC 2A address itself ie the source and target RNC address fields are the same. Thus, there will be no change in RNCs only SGSNs.

Figure 4:
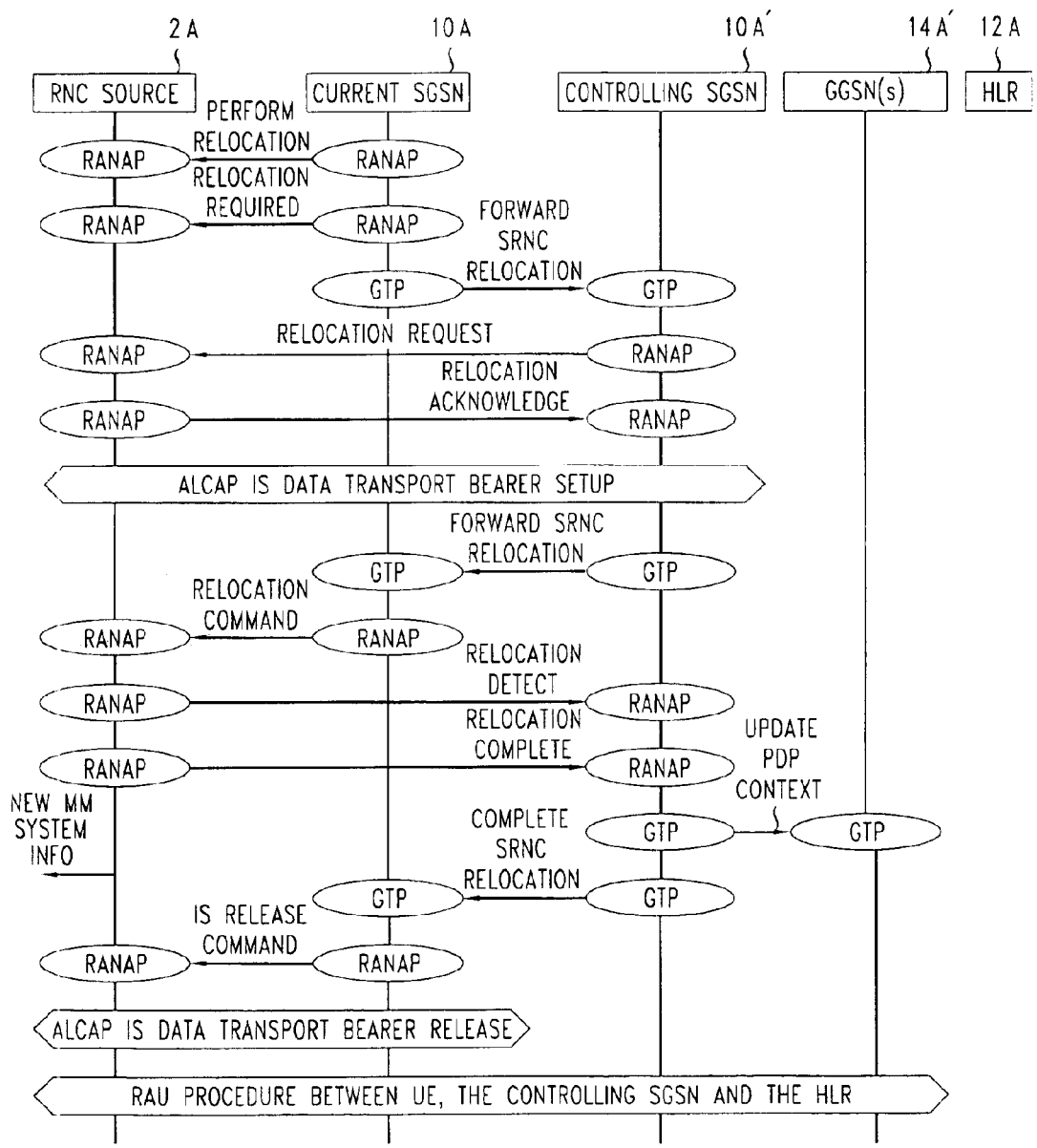
FIG. 4 is a sequence chart showing the handover sequence after termination of a real-time call by the system of FIG. 2.

FIG. 4 illustrates the sequence of events involved using the radio access network application part RANAP and the GPRS tunnelling protocol GTP of the system. The current SGSN 10A transmits a "perform relocation" command which triggers the RNC 2A to start the SRNC relocation procedures. The SRNC 2A sends a "relocation required" to the current SGSN 10A which in turn sends a "forward SRNC relocation" to the controlling SGSN 10A' . The controlling SGSN 10A' sends a relocation request signal to the RNC 2A which responds by returning a relocation acknowledge signal. The access link application protocol (ALCAP) data transport bearer is then set up between the RNC 2A and the controlling SGSN 10A'. The controlling SGSN 10A' then forwards a RNC relocation signal to the current SGSN 10A which responds by sending a relocation command then the RNC 2A replies to the controlling SGSN 10A' indicating that relocation has been detected followed by relocation complete signal when relocation has been completed. The controlling SGSN 10A' sends an updated packet data protocol (PDP context) signal to the GGSN 14A followed by a relocation complete signal to the current SGSN 10A. The current SGSN 10A sends a release command to the RNC 2A following which the ALCAP data transport bearer between the RNC 2A and the current SGSN 10A is released.

Routing data update (RAU) procedures between the mobile 6A the controlling SGSN 10A' and the HLR 12A then take place.

Changes may be made in the combination and arrangement of the elements as herein before set forth in the specification and shown in the drawings, it being understood that changes may be made in the embodiment disclosed without department from the spirit and scope of the invention and defined in the following claims.

We claim:

1. A method of handover of a call with a user equipment (UE) in a telecommunication system comprising a plurality of radio network controllers (RNCs) each having an associated domain and being associated with a corresponding serving general packet radio service (GPRS) support node (SGSN) and an Internet Protocol (IP) network enabling the RNCs to connect to various of the SGSNs, upon the UE relocating from the domain of a serving RNC to the domain of a target RNC, the method comprising the steps of:

(a) receiving a request to handover the call from a serving RNC and its associated SGSN to the target RNC and its associated SGSN;

(b) if the call with the UE is a real-time call, directly rerouting the call from the SGSN associated with the serving RNC to the target RNC through the IP network but not through the SGSN associated with the target RNC;

(c) if the call is no longer a real-time call, rerouting the call to the target RNC via the SGSN associated with the target RNC.

2. A method according to claim 1, wherein the user equipment comprises a mobile telephone.

* * * * *